United States Patent [19]

Gumley

[11] Patent Number: 4,760,213

[45] Date of Patent: Jul. 26, 1988

[54] LIGHTNING CONDUCTOR

[76] Inventor: John R. Gumley, 7 Buscombe Street, Bellerive, Tasmania, 7018, Australia

[21] Appl. No.: 943,271

[22] Filed: Dec. 17, 1986

[30] Foreign Application Priority Data

Dec. 19, 1985 [AU] Australia .............................. PH3982
Aug. 15, 1986 [AU] Australia .............................. PH7528

[51] Int. Cl.$^4$ ............................................ H02G 13/00
[52] U.S. Cl. ........................................ 174/3; 174/4 R; 361/138
[58] Field of Search ...................... 174/2, 3, 4 R, 4 C; 361/117, 137, 231, 138, 212, 216, 220, 222

[56] References Cited

U.S. PATENT DOCUMENTS

| | | | |
|---|---|---|---|
| 1,477,304 | 12/1923 | Allcutt | 361/138 |
| 1,477,305 | 12/1923 | Allcutt | 361/138 X |
| 4,480,146 | 10/1984 | Invernizzi | 174/3 |
| 4,518,816 | 5/1985 | Robert | 174/3 |
| 4,540,844 | 9/1985 | Sautereau et al. | 174/3 |
| 4,565,900 | 1/1986 | Arnau | 174/3 |

FOREIGN PATENT DOCUMENTS 0139575  5/1985  European Pat. Off. ............... 174/2

Primary Examiner—Laramie E. Askin
Attorney, Agent, or Firm—Joseph P. Calabrese; James P. Naughton

[57] ABSTRACT

A lightning conductor having an electrically conductive surface element insulated from an earth rod. The surface element is substantially continuous, but has an aperture defining an air gap. The air gap is located near the top of the earth rod. In atmospheric conditions existing before lightning discharges, arcing occurs between the surface element and the earth rod. This creates plasma about the tip of the earth rod, leading to upward leader formation. A high impedance static drain may be connected between the surface element and the earth rod.

10 Claims, 5 Drawing Sheets

LIGHTNING CONDUCTOR

BACKGROUND OF THE INVENTION

1. Field of the Invention

This invention relates to improvements in lightning conductors.

2. Description of the Prior Art

It is generally agreed that Benjamin Franklin invented the conventional lightning conductor. Prior to 1752 he and three friends showed, through experiments, that electricity was attracted to sharpened pieces of metal. In 1753 Franklin wrote a detailed description of a lightning conductor. Since that time conductors in the nature of sharp pointed rods, located on the top of structures, to capture lightning discharges, have been commonly known as Franklin rods.

Since Franklin first described his concept of lightning protection, there have been a number of perceived improvements to Franklin rods. They may be summarised as follows:

1. Multiples points fanning out from a single rod.
2. Radioactive emissions to enhance air conductivity around the point.
3. A solar or battery powered spark generator to create ionization.
4. Spark generators which derive energy from the natural electric field which exists during a thunderstorm and preceding a lightning stroke.

In U.S. Pat. No. 4,540,844 to Sautereau et al, there is described a single-point Franklin rod which is brought to a high tension potential by a generator to produce and maintain at its maximum a corona discharge. The ions generated by the corona discharge form a column of ionized air above the point of the rod, to facilitate the occurrence of lightning by increasing the conductivity of the atmospheric air.

U.S. Pat. No. 4,518,816 to Robert discloses a lightning conductor which uses a piezoelectric device to create a corona effect and atmospheric ionization.

In U.S. Pat. No. 4,565,900, there is disclosed a single-point rod connected to an accelerator consisting of radially arranged metal deflector plates and needles on a dielectric plate in register with apertures in the metal plate. The rod and plates are positively charged and the needles are negatively charged, the resulting electric field creating ionization.

SUMMARY OF THE INVENTION

It is felt that despite the apparent logic of the prior art ionizing rods, a more effective arrangement is needed, one which would respond dynamically to the appearance of a lightning down leader.

It is accordingly an object of this invention to provide an improved lightning conductor.

The invention provides a device for attracting lightning, said device including at least one electrically conductive surface element insulated from an earth element, there being an air gap between said or each surface element and said earth element such that under particular atmospheric conditions arcing takes place between said surface element or one of said surface elements and said earth element, the arcing leading to plasma creation and upward leader formation.

DESCRIPTION OF THE PREFERRED EMBODIMENTS

Before commencing a detailed description of the embodiments of this invention, reference should again be made to U.S. Pat. No. 4,518,816 to Robert, in particular column 1, lines 14 to 26 thereof. In that section of the patent specification, mention is made of a downward precursor, (or down leader) which consists of charged particles, being directed towards the ground. It is stated that the approach of this down leader creates an intense electric field near the ground, and this in turn creates upward discharges or upward tracers or leaders. The first upward tracer which meets a down leader will close the "circuit" and cause the lightning discharge. Thus, it can be of great benefit to be able to close the "circuit" and attract the lightning discharge to a preferred location.

Figure 1:
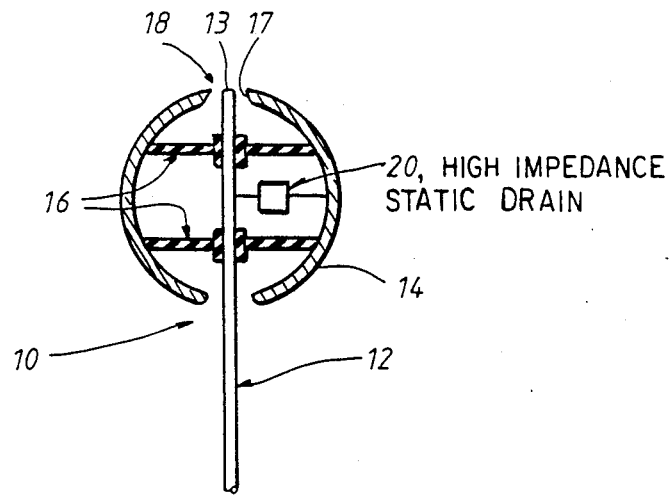
FIG. 1 is a vertical section through a first embodiment of the invention.

FIG. 1 shows one embodiment 10 of the lightning attracting device of this invention. The device 10 includes an earth rod 12 having a tip 13, to which rod a substantially spherical conductive element 14 is attached by insulating supports 16. There is a circular aperture 17 at the top of the spherical element, in a "North Pole" location. An air gap 18 is created between the edge of aperture 17 and the tip 13 of earth rod 12 and a high impedance static drain 20 is connected between element 14 and rod 12. Although the tip 13 of earth rod 12 is shown as being located on the continuation of the surface of the spherical element 14, it may extend beyond such a position, or be otherwise located such as to be in the vicinity of aperture 17.

Figure 2:
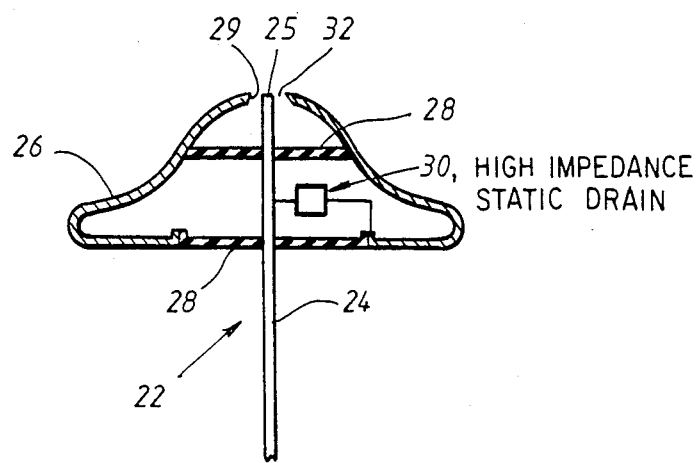
FIG. 2 is a vertical section through a second embodiment of the invention.

In FIG. 2, the embodiment 22 of the lightning attracting device also includes an earthed rod 24, to which a rounded conductive element 26 is connected to earthed rod 24 by insulating supports 28. The element 26 has a complex curved surface which is rather like a radially dished hemisphere with curved edges. Device 22 also has a generally circular aperture 29, there being an air gap 32 between the edge of aperture 29 and the tip 25 of rod 24, and a high impedance static drain 30 connected between element 26 and rod 24.

The obvious visual difference between the described embodiments of this invention and the prior art Franklin rods is that there is here presented a smoothly rounded surface rather than single or multiple points. However, it is possible for the tips 13,25 of rods 12,24 to be sharp, flat, dished, hermispherical, convex, concave or any other shape.

In addition, the system is normally static and is designed to eliminate the corona emissions which occur under the strong electric fields referred to in the introduction, which of course is contrary to the thrust of the described prior art.

Recent studies of conventional lightning protection systems have showed that sharp points, with or without ion creating additions, can cause a corona which forms into a space charge immediately above the point. This space charge has a polarity which acts to reduce the electric field at the point.

Laboratory and field studies show that the strength of the electric field is a critical parameter in forming conditions suitable for upward streamer generation. Streamers, which develop into upward leaders or tracers, are essential to intercepting the downward leader and completing the electric channel between cloud and ground.

As stated, space charges can weaken electric fields about exposed points. They may exist with variable magnitude and can be strongly dependent on factors such as wind velocity. The existence of space charges is the suggested reason for the frequently reported occurrence of lightning missing a Franklin rod.

Figure 3:
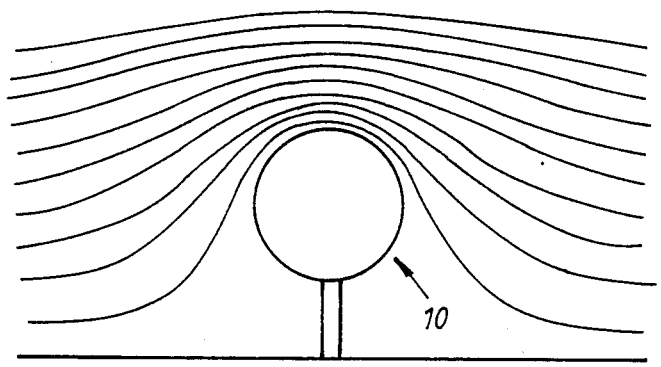
FIG. 3 is a representation of the electric field about the embodiment of FIG. 1 under static conditions.

With the present invention, in the presence of high electric field strengths, without dynamic lightning producing circumstances, the device remains passive. As stated, the surface 14 or 26 is insulated from its support rod 12 or 24 but connected to it by a high impedance network 20 or 30. Under normal static electric field conditions, both surface and rod are effectively grounded. The shape of the whole assembly precludes the generation of corona discharges which can led to formation of a space charge. FIG. 3 shows the electric field about the spherical sphere of FIG. 1 under static field conditions.

On the approach of a lightning down leader, however, the device accordingly responds dynamically by causing electric field intensification and generating electric arcing to form plasma at the top of the conductive surface element. The plasma and the associated electric field effect will create ideal conditions for establishment of a streamer, which then converts to an upward leader which intercepts the down leader. This invention has the ability to launch streamers before other nearby objects and, thus, has the desirable ability to attract lightning.

Figure 4:
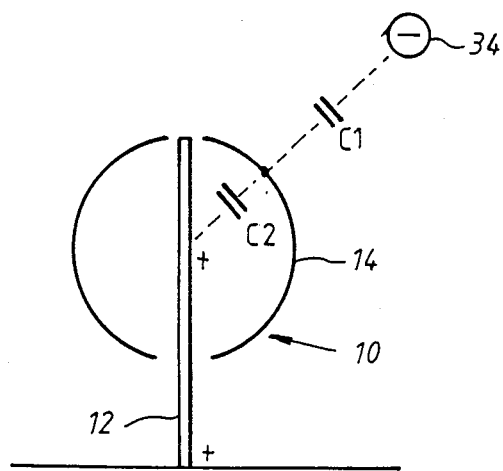
FIG. 4 is a diagrammatic section through a lightning conductor of the type shown in FIG. 1.

FIG. 4 shows diagrammatically the two effective capacitors C1 and C2 which exist, between the surface 14 and the rod 12, and between the surface 14 and the down leader 34, when the down leader approaches, conveying a charge of, typically, 0.5 to 20 coulombs at $10^5$ ms$^{-1}$.

Since a high impedance 20 exists between rod 12 and surface element 14, the element will rise in voltage. The high impedance static drain 20 restricts fast moving discharge currents.

Figure 5:
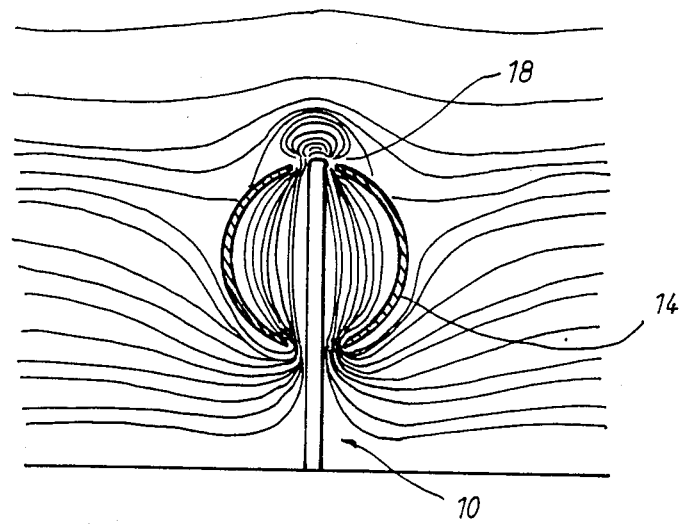
FIG. 5 is a representation of the strong electric field about the embodiment of FIG. 1 as a lightning down leader approaches.
Figure 6:
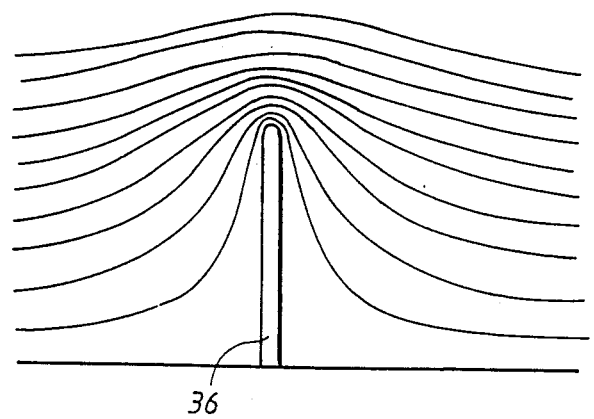
FIG. 6 is a representation similar to that of FIG. 5 showing the field about a Franklin rod in similar circumstances.

The small air gap 18 exists the top of the earthed support rod 12 and the surrounding surface element 14. When this outer insulated section rises in voltage, an electric field forms at the air gap. The geometry of the system creates a pinching effect (see FIG. 5) and produces a strong electric field immediately above the earthed support rod. This can be more intense than that around a conventional Franklin rod 36, which is illustrated in FIG. 6.

If the leader 34 approaches sufficiently close and has adequate charge, arcing will occur. The formation of electrical plasma can trigger an upward streamer which now has a greater chance to propagate due to the absence of an intervening overhead space charge.

It can be seen that the lightning attracting device of this invention is very likely to create the first streamer, upward leader or tracer, and thus lightning may be directed in a relatively controlled manner to the device, rather than to structures which are to be protected.

It is clear that the conductive surface may take many different shapes such as ellipsoidal and inverted saucer-shaped; or other shapes may be used, if for no other reason than to improve capacitance to the leader channel. It may also be found desirable to actually provide a fixed capacitor between the conductive surface element and the earthed rod, to change spark repetitive rate and the energy contained in each spark.

It may also be possible to segment the sphere rather like the slices of an orange. Each segment may be insulated from the earthed rod and from adjacent segments. In this case each segment may be provided with an air gap of different dimension. This procedure would allow arcing to occur as a ripple effect around the rod. Thus, arcing will tend to be continuous during leader approach.

Figure 7:
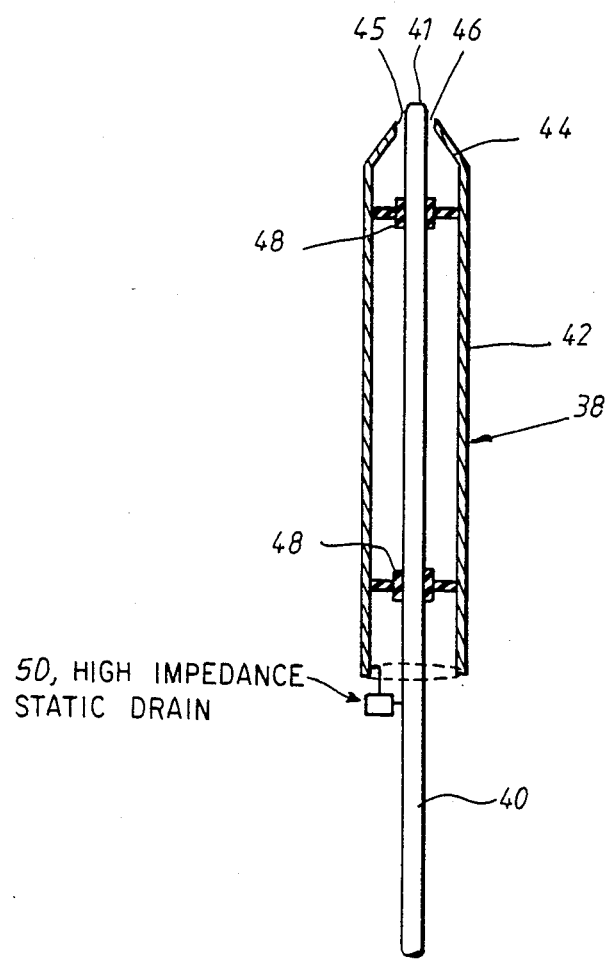
FIG. 7 is a vertical section through a third embodiment of the invention.

In the conductor 38 of FIG. 7, there is a support (earth) rod 40 and a generally cylindrical conductive surface 42. The surface contains a frusto-conical top portion 44, there being an air gap 46 between the edges of aperture 45 at the top of portion 44 and the tip 41 of rod 40. Insulating supports 48 are provided to insulate surface 42 from rod 40.

A static drain arrangement 50 is provided, similar to the high impedance static drain 30 of FIG. 2. The arrangement 50 may alternatively be physically located within the cylinder 42.

Figure 8:
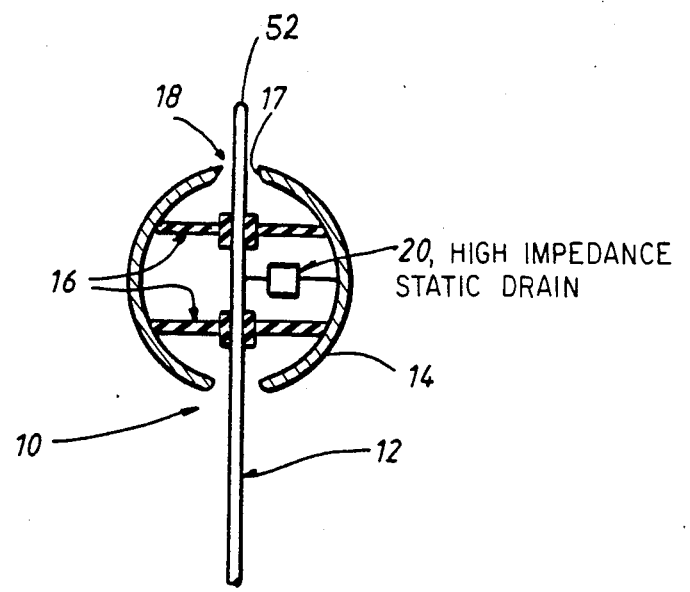
FIG. 8 is a vertical section through a fourth embodiment of the invention.

FIG. 8 illustrates an embodiment substantially identical to that of FIG. 1, and all the reference numerals of FIG. 1 except 13 indicate the same features in FIG. 8.

In FIG. 8, tip 52 of earthed rod 12 is located externally of the spherical surface element 14, to the extent of being located above the intersection of the spherical surface 14 and rod 12 a distance equal to 25% of the diameter of the sphere. The tip, as indicated hereinbefore, may be located at any position between that shown in FIG. 1 and that shown in FIG. 8. It should also be noted that tip 52 has a hemispherical convex profile.

Some advantages of the device of this invention may be summarised as follows:

1. It will not develop a space charge under the static electric field caused by an overhead electrical storm, the whole unit being maintained at earth potential.

2. It will detect the dynamic situation of an approaching lightning leader by capacitive coupling which causes the sphere to rise in potential. This concentrates electric field in a manner similar to a conventional Franklin rod.

3. It will generate electrical plasma by air discharge to assist formation of an upward streamer. This event only occurs during approach of a lightning down leader.

4. It is completely passive and requires no outside energy source.

I claim as my invention:

1. A passive device for attracting lightning, said device including at least one electrically conductive surface element insulated from an earth element; a high impedance drain connected between said or each surface element and said earth element; there being an air gap between said or each electrically conductive surface element and said earth element such that under particular atmospheric conditions, when the approach of a lightning down leader creates an electric field in the vicinity of the device, said device responds to said down leader, in that arcing takes place between said surface element or one of said surface elements and said earth element; the arcing leading to plasma creation and upward leader formation.

2. A device according to claim 1 wherein said or each surface element has a substantially continuous surface; said surface having a discontinuity defining one boundary of said air gap.

3. A passive lightning attracting device including a substantially continuous electrically conductive surface element and an earth element; a high impedance drain connected between said surface element and said earth element; said electrically conductive surface element being insulated from said earth element; one discontinuity in said surface element defining one boundary of an air gap which is in the vicinity of a portion of said earth element, wherein under particular conditions, when the approach of a lightning down leader creates an electric field in the vicinity of the device, said device responds to said leader, in that arcing occurs between said surface element and said earth element; the arcing leading to plasma creation and upward leader formation.

4. A device according to claim 3 wherein said electrically conductive surface element is substantially spherical.

5. A device according to claim 3 wherein said electrically conductive surface element is substantially cylindrical.

6. A device according to claim 4 or 5 wherein said rod terminates in a free end which constitutes said portion of said earth element, and said free end is located at a distance from said discontinuity equivalent to 25% of the diameter of said surface element.

7. A device according to claim 3 wherein said surface element is a radially dished hemisphere with curved edges.

8. A passive lightning conductor comprising a generally spherical, electrically conductive surface element; an earth rod from which said surface element is insulated, and a high impedance drain connected between said surface element and said earth rod; said electrically conductive surface element having an aperture therein defining an air gap between said surface element and said earth rod such that in certain atmospheric conditions associated with the occurrence of lightning, when the approach of a lightning down leader creates an electric field in the vicinity of the lightning conductor, said lightning conductor responds to said down leader, in that arcing between said surface element across said air gap to said earth rod will occur; said arcing leading to plasma creation in the vicinity of said earth rod and to upward leader formation.

9. A lightning conductor according to claim 8, wherein said electrically conductive surface element is supported from said earth rod by insulating supports.

10. A passive lightning attracting device including a plurality of electrically conductive surface elements, each of which is insulated from an earth element and spaced from the other of electrically conductive surface elements; a high impedance drain connected between each of said surface elements and said earth element; there being an air gap between each said surface element and at least a portion of said earth element so that when the approach of a lightning down leader creates an electric field in the vicinity of the device, said device responds to said leader; each air gap allowing arcing between any surface element and said earth element; the arcing causing plasma creation, resulting in upward leader formation.

* * * * *

UNITED STATES PATENT AND TRADEMARK OFFICE
CERTIFICATE OF CORRECTION

PATENT NO. : 4,760,213

DATED : July 26, 1988

INVENTOR(S) : John R. Gumley

It is certified that error appears in the above-identified patent and that said Letters Patent is hereby corrected as shown below:

In Column 1, line 24, "multiples" should be --multiple--.

In Column 3, line 60, between the words "exists" and "the" add the word --between--.

Signed and Sealed this

Fourteenth Day of March, 1989

Attest:

DONALD J. QUIGG

Attesting Officer

Commissioner of Patents and Trademarks